UNITED STATES PATENT OFFICE.

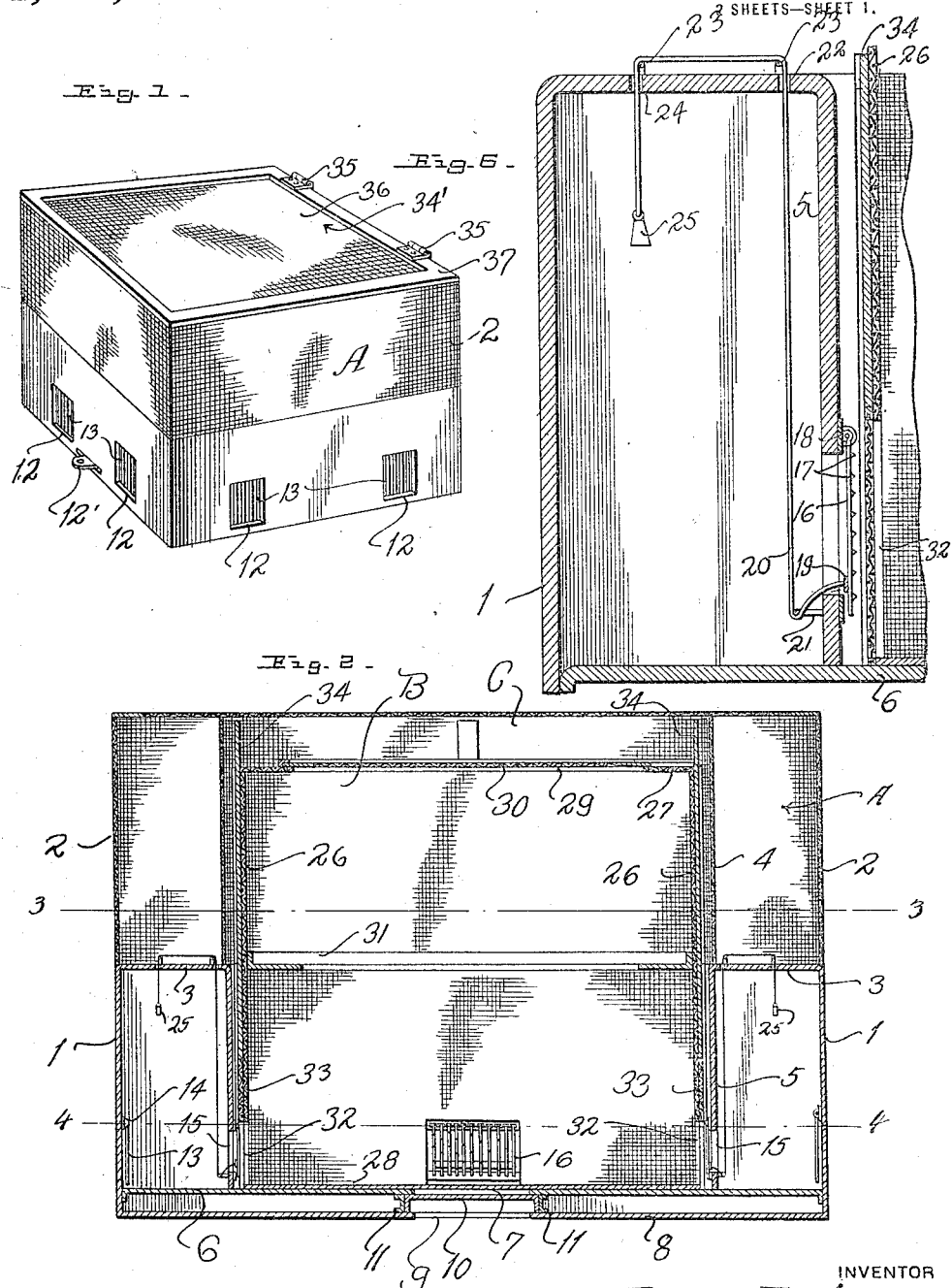

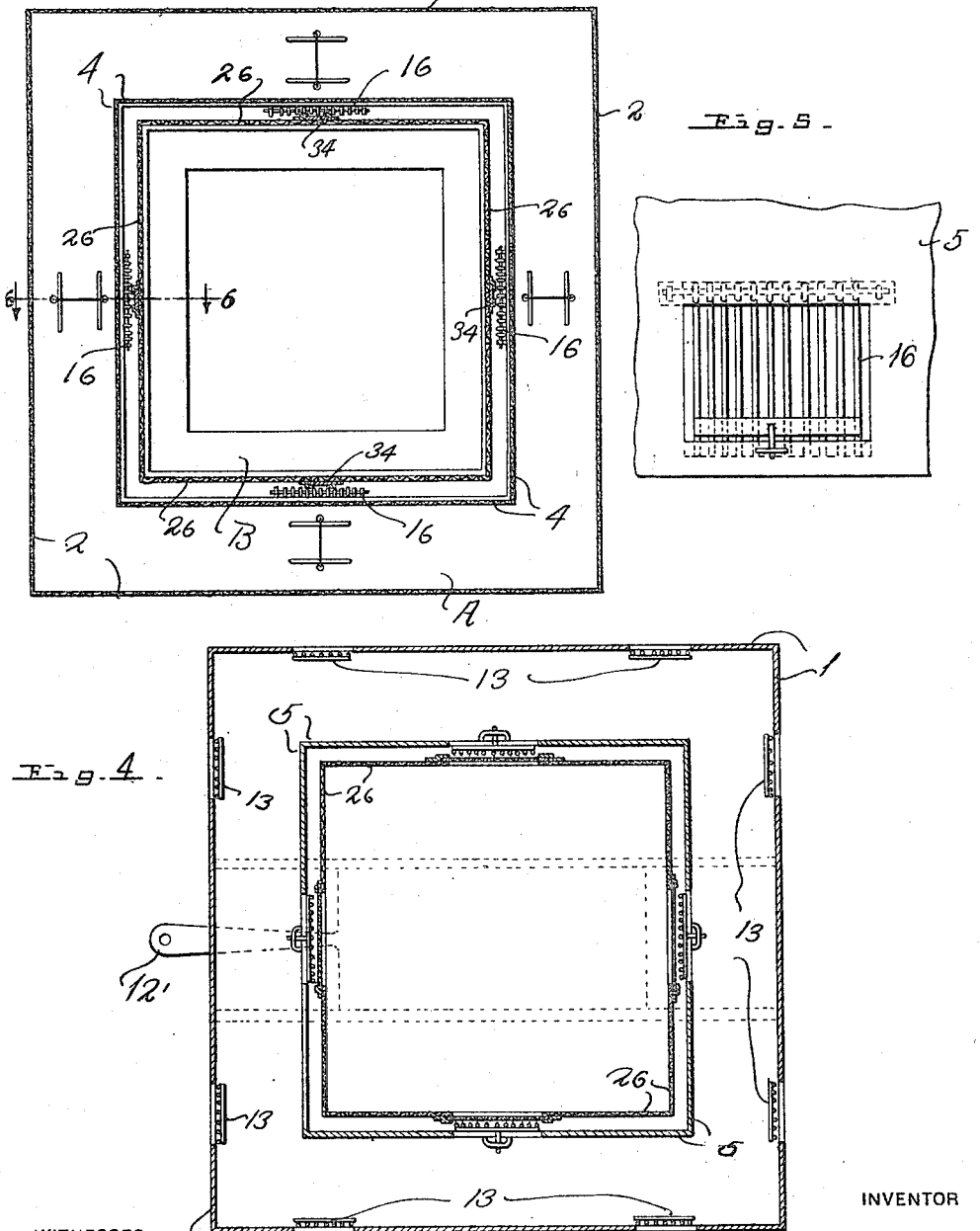

JAMES E. WHITE, OF BALTIMORE, MARYLAND.

TRAP.

1,226,288.  Specification of Letters Patent.  Patented May 15, 1917.

Application filed April 15, 1916. Serial No. 91,377.

*To all whom it may concern:*

Be it known that I, JAMES E. WHITE, a citizen of the United States, residing at Baltimore, in the State of Maryland, have invented certain new and useful Improvements in Traps, of which the following is a specification.

My invention relates to a trap, particularly designed for use in catching such rodents as rats, mice and the like.

It is one object of the present invention to provide a trap which will catch such rodents as above mentioned alive and will securely prevent them from escaping until such time as the trap is cleared.

Another object of the present invention resides in providing a trap wherein the bait may be observed by the prey but cannot be secured by it.

A further object resides in providing a trap having an exterior trap portion housing a secondary trap portion and affording entrance from the former to the latter, whereby the latter may be removed from the exterior trap portion in order to clear the trap and yet the exterior trap portion will still remain active and efficient as a trap.

With the above and other objects in view, I will now proceed to describe a specific form of the present invention which I have illustrated in the accompanying drawings forming a part of this specification and wherein:

Figure 1 is a view, in perspective, of a trap constructed according to my invention.

Fig. 2 is a sectional view vertically through the trap.

Fig. 3 is a sectional view on the line 3—3 of Fig. 2.

Fig. 4 is a sectional view on the line 4—4 of Fig. 2,

Fig. 5 is a detail elevation of one of the doors of the exterior trap portion, and Fig. 6 is an enlarged vertical section on the line 6—6 of Fig. 3.

The trap, as herein shown, and to be described, comprises an exterior trap portion hereinafter designated as A and an interior or secondary trap portion hereinafter designated as B.

The exterior trap portion comprises an inclosure having side walls with opaque lower portions 1 and preferably mesh upper portions 2, though these upper portions may be of any suitable material which will permit of observation therethrough. Intermediate the upper and lower portions 1 and 2 of these walls is a bait supporting structure 3. The outer trap portion A has a central opening C and the inner walls thereof are designated at 4 and 5 and are constructed similarly to the outer walls, that is to say, each wall comprises the portions 4 and 5, the former of which will permit observation therethrough and the latter of which is preferably of opaque material such as sheet metal. The outer trap portion A has a false bottom 6 provided with an opening 7 and a real bottom 8 also provided with an opening 9. The openings in the two are, however, closed by a slidable door 10 which runs between tracks 11 and is operated through the medium of a lever 12' extending through one of the side walls of the exterior trap portion. In the lower portions 1 of the outer walls of the exterior trap portion are openings 12 forming doorways which are closed by the gratings 13 forming doors and which are hinged on the interior of the trap at the upper edge as shown at 14 so that they may swing inwardly of the trap portion but not outwardly thereby affording ingress or entrance to the trap but preventing escape therefrom. The lower portions 5 of the inner walls of the exterior trap portion are also provided with door openings 15 which are provided with doors 16 having spurs 17 on the interior side thereof which will prevent the animal from attempting to destroy the door. These doors are hinged on the interior side of the trap as shown at 18 and the bottom portion thereof is connected at 19 with a suitable cable 20 trained through a bracket 21 and thence upwardly through apertures 22 in the bait supporting structure over brackets 23 and downwardly through apertures 24 and connected with a weight 25; therefore, the animal may escape from the interior wall by operating these doors which are immediately closed behind him and prevent him from reëntering the exterior trap. The object of the above doors 16 will appear when the secondary trap is described. However, the secondary trap B is placed within the exterior trap portion and fills or practically fills the opening C. The secondary trap portion B consists of an inclosure having the side walls 26 of mesh, top 27 of similar material and bottom 28 of sheet metal or the like. The secondary trap portion is provided with a door opening 29 at the top thereof closed by a door 30. Intermediate the height of the side walls 26 is positioned a flange 31 which extends inwardly of the secondary trap portion and forms a balcony. The secondary trap portion is provided with door openings 32 which, when the same is in place in the exterior trap portion registers with the doors 15 in the latter. The door openings 32 are closed by vertically slidable doors 33 connected with the operating members 34 and when the secondary trap is within the exterior trap portion these doors are opened and thus the animals or rodents entrapped may have access to the interior of the secondary portion B and when it is desired to clear the trap the sliding doors 33 may close and all of the rodents may be trapped in the secondary trap portion which may then be removed and they may be dumped through the door opening 29 into water or the like in order to drown them.

The upper portion or top of the exterior trap A is entirely open and is closed by a door 34 hinged at 35 and comprising the mesh portion 36 and frame 37.

I claim:

1. In a trap, a box member, a wall disposed within said box member and spaced from the walls of the latter, a roof portion connecting said wall with said box member, the said wall and box member being provided with openings, a door arranged adjacent each of the openings in said wall and being capable of swinging inwardly and upwardly, a cord attached to each door and extending through said roof portion, the extremity of said cord extending downwardly through said roof, and a weight on the end of said cord.

2. In a trap, inner and outer box members, a wall secured to the outer box member and snugly surrounding said inner box member, a roof portion connecting said wall with said outer box member, the said outer box member, wall and inner box member being provided with openings, and doors for closing all of said openings.

3. In a trap, an outer box, a wall arranged within said box and being spaced from the latter, a top connecting said wall and box, the said wall and box having openings, an inner box removably arranged within said wall and having openings alined with those of said wall, and doors closing said openings.

4. In a trap, an outer box having a foraminous upper portion, a wall arranged within said box, a roof connecting said wall with said box at the juncture of the foraminous portion therewith, the said wall and box having openings, doors closing said openings, an inner box removably arranged within said wall and being provided with openings alined with those of said wall, and a lid on said outer box.

In testimony whereof I affix my signature in presence of two witnesses.

JAMES E. WHITE.

Witnesses:
CHARLES REVIOL,
MARY WHITE.

Copies of this patent may be obtained for five cents each, by addressing the "Commissioner of Patents, Washington, D. C."